(12) United States Patent
De Keyser et al.

(10) Patent No.: US 11,361,119 B2
(45) Date of Patent: Jun. 14, 2022

(54) METHOD, COMPUTER PROGRAM PRODUCT, AND SERVER FOR POSITIONING A STRUCTURAL ELEMENT IN A 2D SECTION OF A CAD STRUCTURE

(71) Applicant: Bricsys NV, Ghent (BE)

(72) Inventors: Erik De Keyser, Ghent (BE); Pieter Clarysse, Vurste (BE); Luc De Batselier, Ghent (BE)

(73) Assignee: BRICSYS NV, Ghent (BE)

( * ) Notice: Subject to any disclaimer, the term of this patent is extended or adjusted under 35 U.S.C. 154(b) by 778 days.

(21) Appl. No.: 16/080,687

(22) PCT Filed: Apr. 5, 2017

(86) PCT No.: PCT/EP2017/058072
§ 371 (c)(1),
(2) Date: Aug. 29, 2018

(87) PCT Pub. No.: WO2017/174636
PCT Pub. Date: Oct. 12, 2017

(65) Prior Publication Data
US 2019/0095549 A1 Mar. 28, 2019

(30) Foreign Application Priority Data

Apr. 5, 2016 (WO) .................. PCT/EP2016/057425

(51) Int. Cl.
*G06F 30/13* (2020.01)
*G06F 3/04845* (2022.01)
(Continued)

(52) U.S. Cl.
CPC .......... *G06F 30/13* (2020.01); *G06F 3/04812* (2013.01); *G06F 3/04845* (2013.01);
(Continued)

(58) Field of Classification Search
CPC ...... G06F 30/13; G06F 30/00; G06F 3/04845; G06F 3/04812; G06F 2111/02;
(Continued)

(56) References Cited

U.S. PATENT DOCUMENTS

| | | | |
|---|---|---|---|
| 6,480,813 B1 | 11/2002 | Bloomquist | |
| 2006/0173657 A1* | 8/2006 | Haws | G06F 30/13 703/1 |
| 2012/0249539 A1* | 10/2012 | Bhattacharya | G06T 19/003 345/419 |

FOREIGN PATENT DOCUMENTS

WO 2015018441 A1 2/2015

OTHER PUBLICATIONS

Anonymous; Ashlaw-Vellum: Cobalt, Xenon & Argon: "Designer Elements—3D Modeling User Guide", published Jan. 1, 2003.
(Continued)

*Primary Examiner* — Bijan Mapar
(74) *Attorney, Agent, or Firm* — Maschoff Brennan

(57) ABSTRACT

The present invention relates to a computer-implemented method, a computer program product, and a server for positioning a structural element in a 2D section of a CAD structure. The invention is characterized in that at least two distances, each distance in between an alignment line of the structural element and a parallel reference line of the 2D section, are displayed on a user visualization means and dynamically updated as the location of the structural element within the 2D section is changed. In a preferred embodiment, the reference lines are dynamically chosen based on the location of the structural element within the 2D section.

18 Claims, 5 Drawing Sheets

(51) Int. Cl.
  *G06F 3/04812*   (2022.01)
  *G06T 11/00*     (2006.01)
  *G06F 30/00*     (2020.01)
  *G06F 3/04842*   (2022.01)
  *G06T 3/00*      (2006.01)
  *G06T 11/20*     (2006.01)
  *G06F 111/02*    (2020.01)
  *G06F 111/04*    (2020.01)

(52) U.S. Cl.
  CPC .............. *G06F 30/00* (2020.01); *G06T 11/00* (2013.01); *G06F 3/04842* (2013.01); *G06F 2111/02* (2020.01); *G06F 2111/04* (2020.01); *G06T 3/0081* (2013.01); *G06T 11/203* (2013.01); *G06T 2210/04* (2013.01)

(58) Field of Classification Search
  CPC .. G06F 2111/04; G06F 3/04842; G06T 11/00; G06T 3/0081; G06T 11/203; G06T 2210/04
  See application file for complete search history.

(56) References Cited

OTHER PUBLICATIONS

Anonymous; Alllplan 2008 Tutorial Architektur, published Mar. 31, 2008.

* cited by examiner

METHOD, COMPUTER PROGRAM PRODUCT, AND SERVER FOR POSITIONING A STRUCTURAL ELEMENT IN A 2D SECTION OF A CAD STRUCTURE

This application claims the benefit of PCT/DP2016/057425 filed Apr. 5, 2016 and PCT/EP2017/058072 filed Apr. 5, 2017, International Publication No. WO 2017/174636 A1, which are hereby incorporated by reference in their entirety as if fully set forth herein.

TECHNICAL FIELD

The present invention pertains generally to the technical field of computer-aided design (CAD). More specifically, the invention relates to a computer-implemented method, a computer program product, and a server for positioning a structural element in a 2D section of a CAD structure.

BACKGROUND

CAD software applications provide users with the capability to create and edit geometry, models and drawings using actions or commands. Typical CAD software applications are AutoCAD, Inventor, Solidworks, Spaceclaim, BricsCAD, etc. CAD and other drawing programs allow the preparation and editing of machine drawings, schematic drawings and artwork. Typically, the user creates these drawings with the use of a library of objects and a number of drawing tools. These drawing tools allow the user to define and edit lines, polygons, ovoids and other shapes.

One useful feature in such drawing programs is the ability to draw new objects and to define new precision points using alignment lines based upon geometric relationships with existing objects or portions of existing objects.

U.S. Pat. No. 6,480,813 discloses a method and apparatus for defining a precision drawing point in a drawing program, involving displaying one or more alignment lines that pass through one or more user-selected temporary points, when the cursor is moved within snap distance of the one or more alignment lines. The disclosed method however does not disclose how to define a point in space at a certain distance of a set of non-parallel reference lines, which is a valuable tool when designing a building in a building information model (BIM) in a CAD application. What is needed is a method for defining a precision drawing point with respect to non-parallel reference lines in a user-defined 2D cross section, preferentially having the possibility to determine the reference lines dynamically in a user-friendly manner. The present invention satisfies that need.

Allplan 2008 Tutorial Architektur, NEMETSCHEK Allplan Gmbh, Munich, Germany, 2008 (http://www.allplan.net/cms/fileadmin/media/Tutorials/Tutorial_Allplan_2008_Archite ktur.pdf) discloses in "Bezugspunkt bei der Eingabe von Architekturelementen" on pages 95-96 the insertion of an opening, such as a window opening, in a wall. When such an opening is positioned, the nearest reference point to the cursor position, e.g. an end of the wall, is automatically shown and its distance displayed. This distance can be edited by the user to precisely define the position of the opening. The disclosed method allows to display and define a single distance with respect to a single reference point.

However, the method described in Allplan 2008 Tutorial Architektur does not disclose how to display and define a position of such an entire opening, and more specifically its boundary, with respect to multiple, possibly non-parallel, reference lines. Furthermore, once the user has clicked on the wall to position a new structural element, the nearest reference point has been chosen, and it remains fixed upon altering the distance. Furthermore, once the user has clicked on the wall to position a new structural element, the distance cannot be changed anymore by visually dragging the structural element over the screen by guidance of a user input device, only by typing the distance. What is needed is a method for defining a precision drawing point with respect to non-parallel reference lines in a user-defined 2D cross section, preferentially having the possibility to determine the reference lines dynamically in a user-friendly manner.

The present invention aims to resolve at least some of the problems mentioned above.

The invention thereto aims to provide a single set of tools that can be used from concept through completion, in the same environment, while allowing the user to design in a natural, interactive, direct, and desirable manner.

There remains a need in the art for an improved method to determine a drawing location with respect to two (or more) reference lines in a CAD model. The invention thereto aims to provide such method.

SUMMARY OF THE INVENTION

In a first aspect, the present invention relates to a computer-implemented method for positioning a structural element in a 2D section of a CAD structure, as described in claim 1.

The method according to an embodiment of the invention is particularly suitable for adding a drawing location on a well-defined location relative to previously-defined objects of a CAD model.

In a second aspect, the present invention provides a computer program product for positioning a structural element in a 2D section of a CAD structure, as described in claim 14.

In a third aspect, the present invention provides a server for positioning a structural element in a 2D section of a CAD structure, as described in claim 15.

DETAILED DESCRIPTION OF THE INVENTION

Figure 1:
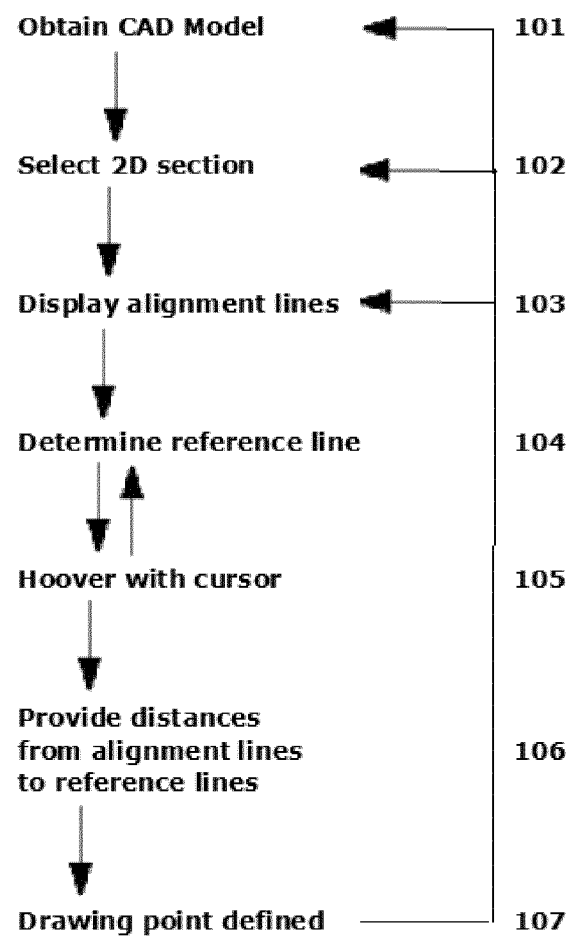
FIG. 1 shows an embodiment of a flow chart of the method for defining a precision drawing location in a CAD model.

The present invention concerns a method, a computer program product and a server for defining a precision drawing location in a CAD model.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The term "2D section" refers to any two-dimensional structure of a model, comprising faces of objects and cross sections of the model.

The term "alignment line" refers to a line, preferentially comprised by an inserted object, which is to be positioned in a 2D section of the model. To position two given intersecting alignment lines, it is sufficient to determine the position of the intersection point of the alignment lines, whereby the intersection point comprises the precision drawing location.

The term "reference line" refers to a line serving as a basis to which a distance to an alignment line can be set. Said reference lines comprise a portion of a line comprised by a selected 2D section, which is comprised by a CAD BIM model. Therefore, a reference line can be but is not necessarily the border line of the 2D section of an object, whereby the 2D section can comprise a face of a 3D object or solid. Possible reference lines comprise any boundary edge of an object at least partially comprised by the 2D section. As an example, when a user requires the insertion of a window in a wall, the window determines the alignment lines. The bounding edges of a face of the wall can comprise the reference lines, which can also be comprised by the edges of a previously provided door in the same wall. The determination of the reference lines depends on a position of a cursor on the face of the wall, whereby the cursor preferentially intersects with two of the intersecting alignment lines.

The term "dynamic dimensions" refers to dimensions that can be dynamically changed while placing an object in a face of a 3D solid. During placement of an object (like a window of a door) on a 3D solid face, dynamic dimensions are created, starting from the middle of each of the bounding edges (like a bounding rectangle) of the object to the nearest parallel edge (i.e. side line) on the face of the 3D solid. The bounding edges of the object are comprised by the alignment lines, while the parallel edges are comprised by the reference lines.

The term "lock a distance" refers to the fixation of a distance between a reference line and an alignment line. When a distance is locked, a set of alignment lines and therefore a corresponding inserted object can only be shifted along unlocked directions. Capturing a distance results in a reduced number of degrees of freedom, which can assist a user while determining the position of an object in a 2D section, e.g. a face of a 3D solid.

The term "user input device" refers in this document to any device suitable to provide input to a computer or a computing system. The input is not limited to a certain modality and can comprise mechanical movement, sound, images, and the like. The input can be discrete and/or continuous. The input is in addition not limited by the number of degrees of freedom. The input may comprise direct input. The input may comprise indirect input. Upon providing input with respect to a position or the change thereof, e.g. a cursor position on a screen, the input can be absolute or relative. A non-limitative list of examples of user input devices comprises a keyboard, a computer mouse, a touchpad, a touchscreen, a camera, a scanner, a joystick, a microphone, a light pen, a trackball, a projected keyboard and a game controller. Preferably, the "at least one user input device" comprises in this document a text input device such as, for example, a keyboard, a touchscreen on which a keyboard is displayed, a projected keyboard, and the like. Preferably, the "at least one user input device" comprises in this document a cursor movement device such as, for example, a computer mouse, a touchpad, a touchscreen, and the like.

The term "user visualization device" refers in this document to any device suitable to visualize a computer-rendered image. A non-limitative list of examples of user visualization devices comprises a screen, multiple screens, and a projector.

Figure 2:
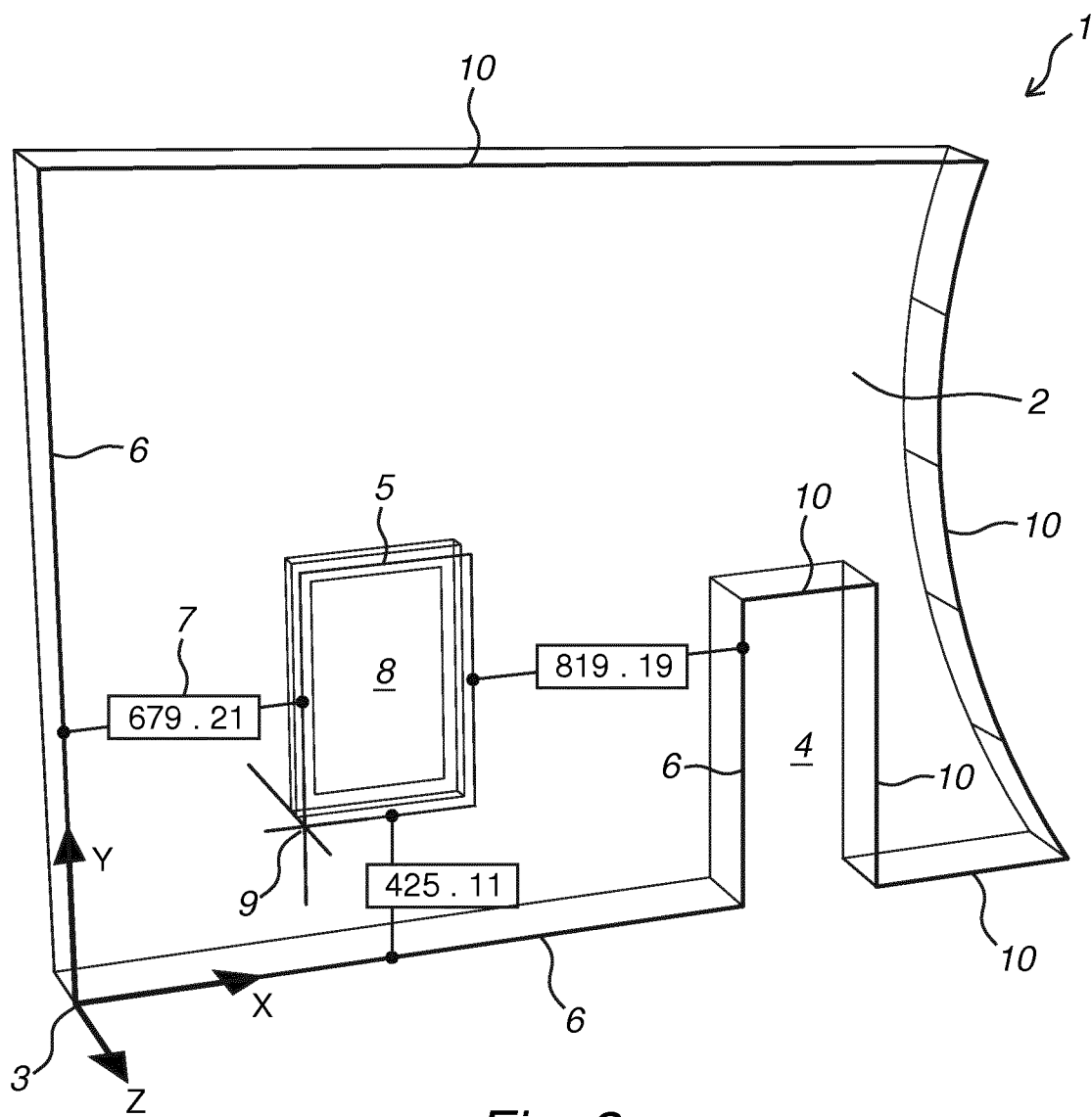
FIGS. 2, 3, 4, and 5 illustrate different steps of embodiments of the method based on specific examples.

In a first aspect, the invention provides a computer-implemented method for defining a precision drawing location, comprising the steps of:
  obtaining a model in a computer-aided (CAD) building information modeling (BIM) application;
  selecting a 2D section of the model;
  displaying at least one alignment line in the 2D section;
  determining at least one reference line comprised by the 2D section, each reference line being parallel to one of the at least one alignment line;
  providing a first distance d1 from a first alignment line to a first reference line,
characterized in that the determination of the at least one reference line is performed dynamically depending on a position of a cursor. This provides the user the possibility to easily determine the reference lines of choice, which is a convenient feature of the user-friendly method of the current invention. As such, the alignment lines can be easily positioned with respect to the relevant reference lines. While designing and providing a sub-object (like a window or a door) to an object (like a wall) comprised by the model, a user often requires to position the sub-object with respect to different side lines or other sub-objects comprised by the model (e.g. a previously defined window or the edge of an adjacent wall crossing the 2D section, as is also illustrated in FIG. 2). The method of the current invention provides the means to easily loop over the different possible reference lines, with a straightforward determination of the reference lines by the cursor position. Preferentially, each of the reference lines is comprised by the 2D section. In a preferred embodiment the lines comprised by the 2D section which are the closest parallel lines to each of the alignment line are chosen as the corresponding reference lines.

In an embodiment of the method, the model comprises a 2D or a 3D model like a composite object, comprising a variety of objects. The 2D section can be selected hovering with a cursor input device over the model for a predetermined period of time and comprises generally a face of a 3D solid. The faces of a 3D solid can highlight while the cursor is over a solid. In order to select the 2D section, a command can be specified comprising user input provided by means of a combination of external input devices. In another embodiment the 2D section comprises a cross section of one or more objects comprised by a composite object.

In a preferred embodiment, at least two intersecting alignment lines are present in the 2D section and the method comprises a step for providing a second distance d2 from a second alignment line to a second reference line. As such, the two dimensions of the 2D section are covered by the alignment lines and the precision drawing point/location can be uniquely determined. In case more than two alignment lines are provided, the distance from the closest parallel reference line to each of the alignment lines can be provided.

In a preferred embodiment of the method two of the at least two alignment lines intersect with the cursor position and track the cursor position while a user is hovering over the 2D section of the model. By displaying alignment lines intersecting in the cursor position, a user is provided with spatial insights in the drawing, improving the designing capabilities. The user can drag the alignment lines over the 2D section, while the cursor position determines the reference lines. Preferentially, the distance from the alignment lines to the determined reference line is shown to the user. In practice, the determined reference lines are preferentially the lines comprised by the 2D section which are closest to and parallel to the alignment lines.

In an embodiment, a User Coordinate System (UCS) aligns dynamically with the selected 2D section. If the cursor enters a solid, comprising the 2D section, via a horizontal or vertical edge, the X-axis of the UCS is horizontal, otherwise the X-axis is aligned with the edge by which the cursor entered the solid. The Z-axis is perpendicular to the 2D section, which is in practice often the direction of the thickness of the 3D solid.

In a preferred embodiment, the alignment lines comprise bounding edges of an inserted object, like a door or a window. Preferentially, the distances between the alignment lines and the corresponding reference lines are indicated from the middle of the bounding edges. Because the UCS aligns with the 2D section and the reference lines comprised by the 2D section are parallel to the alignment lines, the orientation of the UCS is well-suited for the given alignment lines.

In a preferred embodiment of the invention, the alignment lines are straight lines.

In a preferred embodiment of the invention, four alignment lines are displayed as a parallelogram-shaped object in the 2D section and four reference lines, each being parallel to one of the four alignment lines, are determined in the 2D section, whereby a first, second, third and fourth distance from each of the four alignment lines to the corresponding closest parallel reference lines can be provided.

In a further preferred embodiment, the four alignment lines are displayed as a rectangular-shaped object in the 2D section and four corresponding reference lines are determined in the 2D section, if available. Each of said corresponding reference lines is a closest parallel line to one of the four alignment lines, whereby a first, second, third and fourth distance from each of the four alignment lines to the corresponding closest parallel reference lines can be provided. Beam-shaped objects, comprising rectangular faces, are frequently used in the designing and modelling process. Typically, the alignment lines comprise the contours or boundaries of a door or window, which is to be provided on the 2D face of a 3D solid such as a wall. The method provides means to precisely insert an object in a 3D solid, improving the "What You See Is What You Get" (WYSIWYG) user experience.

In practice the reference lines often partially comprise a side line or boundary edge of the 2D section. In another embodiment, each of the reference lines comprises at least partially a side line, whereby the side lines intersect in a corner of said 2D section. Said side lines can comprise edges of faces or cross sections of objects comprised by a composite object. In a further preferred embodiment, the 2D section comprises a face of a 3D solid object, whereby the reference lines of the 2D section comprise the boundaries of the selected face of the object. In case the 3D solid is a cuboid and the 2D section is a face of said cuboid, the reference lines can comprise the four rectangular-shaped boundary edges of said face.

In a preferred embodiment of the invention, one of the provided distances is locked. By locking one of the distances, the degrees of freedom for positioning the alignment lines are reduced, guiding the user to position the alignment lines, which preferentially comprise the boundary edges of an object. The distances d1 and/or d2 can be manually provided and locked by user input in a dialog box, or, by selecting and dragging an alignment line with a cursor input device. Locked distances can be indicated with a specific color. In a possible embodiment, the distances can be provided by snap tracking, whereby a predefined snap distance is applied to position the alignment lines while dragging with the cursor input device. In order to select and/or lock different lines, a combination of input by means of external input devices, such as a cursor input device or a keyboard input device, can be provided. If, for example, the first distance d1 is locked after its provision, the first alignment line is separated from the first reference line 6 a fixed distance d1, whereby a user can select the desired position of the precision drawing location along the locked alignment line by providing the distance d2 by means of any external input device (e.g. clicking with the cursor input or providing the distance in a dialog box).

In a further preferred embodiment of the method, only one of the two distances to parallel reference lines can be locked, to avoid conflicting locked distances. For example, if the alignment lines comprise the edges of an object, like a door or a window, with predefined dimensions, only one of two parallel distances can be locked. In case a user provides and locks a first distance d1 between one of the vertical alignment lines comprised by the object and its corresponding reference line, providing an arbitrary second distance between the other vertical alignment line and its corresponding reference line could result in a conflict, as the dimensions of the object and reference lines of the 2D section can be fixed at this step of the method. In practice, a previously locked distance will be overwritten/overruled by a second distance if these are in conflict, unlocking the previously locked distance. This provides the user a user-friendly method to use several reference lines to position the object in the 2D section.

In a preferred embodiment, the method comprises a step to alter one or more dimensions of the inserted object, which can be comprised in a separate edit mode of the method. In practice, during the design of a model, one requires to change the dimensions and sizes of inserted objects. While editing the dimensions of the inserted object, the locked distances from the reference lines to the alignment lines, thus the locked boundary edges of the inserted object, remain fixed. One can switch between the "select a precision drawing location" mode, i.e. to define the position of the inserted object, and the "edit inserted object" mode providing predefined user input from any external input device. In a preferred embodiment, the dimensions of an inserted object can be edited by dragging boundary edges with a cursor device, possibly with controllable snap features, or by manually inserting the dimensions by means of a keyboard input device. Furthermore, a user can preset certain snap distances, providing guidance while designing the model. Preferentially, these snap distances can be overwritten by a user, defining more specific and precise distances.

In some examples of the embodiments as described above, the at least two alignment lines are straight and have only one intersection point. As a consequence, the corresponding parallel reference lines are also straight lines, having one intersection point. In the latter case, a precision drawing location is uniquely determined by the provision of the two distances to the reference lines.

In a particularly preferred embodiment, the distances from the alignment lines to the corresponding reference lines are displayed while the cursor is hovering over the 2D section. Displaying said distances has the advantage that a user can immediately estimate the dimensions of the model and the position of the sought after drawing location with respect to the particular reference lines. Moreover, it can be useful if a user desires to determine the precision drawing location by clicking with a cursor input device.

In a preferred embodiment, the 2D section is displayed separately in a drawable interface instance on a display device communicatively coupled to the computer in response to the selection of the 2D section. The separate display enables focusing on the details of the 2D section by providing an exploded view.

In another preferred embodiment, the method comprises a step for confirming the selection of the 2D cross section and/or the determination of the at least one reference line. This step is particularly useful because the method automatically selects two reference lines based on the inherent shapes comprised by the 2D cross section. In many cases, edges or border lines of objects are the desired reference lines, which can be selected automatically by the method and proposed to the user as reference line. However, in some cases a user desires more control over the determination process of the reference lines. In the latter case, it is suitable to confirm the determination of the reference lines. At any stage, it is possible to alter the selected reference lines. Moreover, in another embodiment, it is possible to select more than one reference line for a particular alignment line, whereby a user can choose to which reference line the distance is provided in order to determine the precision drawing location.

In another embodiment the alignment lines and the reference lines are equal in number, providing a user the possibility to separately provide the desired distances to each of the alignment lines.

In a preferred embodiment of the method, temporary tracking points or lines can be used. So-called entity snaps enable to quickly select exact geometric points on existing entities without having to know the exact coordinates of those points. With entity snaps, one can select the end point of a line of arc, the center of a circle, the intersection of any two or more entities or objects, or any other geometrically significant position. A user can employ entity snaps to draw entities that are tangent or perpendicular to an existing entity. Said entity snaps can be useful in providing particular reference lines in a 2D section.

In a second aspect, the invention provides a computer program product for defining a precision drawing location in a CAD model. Said computer program product comprises at least one computer-readable storage medium having computer-readable program code portions stored therein, the computer-readable program code portions comprising instructions for:
  obtaining a model in a computer-aided design (CAD) building information modeling (BIM) application;
  selecting a 2D section of the model;
  displaying at least one alignment line in the 2D section;
  determining at least one reference line comprised by the 2D section, each reference line being parallel to one of the at least one alignment line;
  providing a first distance d1 from a first alignment line to a first reference line,
characterized in that the determination of the at least one reference line is performed dynamically depending on a position of a cursor.

In a preferred embodiment, the computer program product enables to perform the computer-implemented method as described above.

In a third aspect, the invention provides a server for defining a precision drawing location in a CAD model using a computer device connected to the server via a network, the server comprising:
  an input receiving module, the input receiving module configured to receive tasks from a user;
  at least one processor, the at least on processor configured to:
    obtaining a model in a computer-aided design (CAD) building information modeling (BIM) application;
    selecting a 2D section of the model;
    displaying at least one alignment line in the 2D section;
    determining at least one reference line comprised by the 2D section, each reference line being parallel to one of the at least one alignment line;
    providing a first distance d1 from a first alignment line to a first reference line,
characterized in that the determination of the at least one reference line is performed dynamically depending on a position of a cursor.

In a preferred embodiment, the server enables to perform the computer-implemented method as described above.

The network used to connect to the server comprises the networks known in the state of the art, like the Internet, local area networks (LANs), wide area networks (WANs), system network architecture (SNA), or the like. Possible computer devices comprise personal computers or workstations, minicomputers or the like. This document does not intend to limit the use of any computers nor networks.

The invention may relate to a computer-implemented method for positioning a structural element in a 2D section of a CAD structure. Preferably, the CAD structure comprises a computer-aided design (CAD) building information model (BIM). The computer-implemented method can be performed by means of a computing system comprising a user visualization device and at least one user input device. Preferably the at least one user input device comprises a text input device and a cursor movement device. The text input device and the cursor movement device may be the same device, such as, for example, a touchscreen. The text input device and the cursor movement device may also be separate devices, such as, for example, a keyboard and a computer mouse. The structural element comprises at least two alignment lines. The 2D section comprises multiple section lines. The computer-implemented method comprises the steps of:
  displaying at least part of the CAD structure on the user visualization device;
  preferably, selecting the 2D section of the CAD structure based on signals from the at least one user input device;
  inserting the structural element in the 2D section based on signals from the at least one user input device, whereby the inserted structural element comprises a location within the 2D section;
  displaying information related to the location on the user visualization device, comprising the steps of:
    selecting for each alignment line of the at least two alignment lines a corresponding parallel reference line from said multiple section lines based on said location; and displaying for each alignment line the distance to said corresponding reference line;

updating the location of said structural element within said 2D section based on signals from the at least one user input device, thereby displaying information related to the updated location on the user visualization device.

The structural element may be an opening such as a window, a window opening, a door, or a door opening placed in a 2D section such as a wall or a roof of a BIM. The structural element may be furniture such as a cupboard or a closet positioned relative to a 2D section such as a wall or a floor. The structural element may be sanitary equipment such as a sink, a toilet, or a wash basin positioned relative to a 2D section such as a floor. The structural element may be electrical equipment such as a power outlet, a board, or a light switch placed relative to a 2D section such as a wall or a floor. The structural element may be HVAC (heating ventilation and air conditioning) equipment such as an outlet, a boiler, or a radiator positioned relative to a floor or a wall. The structural element may also be other equipment such as a fire extinguisher, a fire blanket, smoke detector or a mailbox positioned relative to a floor, a ceiling, or a wall. On the user visualization device, a projected representation of the structural element within the 2D section is shown for the positioning. The structural element is the "inserted object" or the "sub-object" as referred to above.

The computer-implemented method has several advantages. First of all, the location of the structural element within the 2D section is indicated on the user visualization device by a visual representation of at least two distances, each distance in between an alignment line of the structural element and a parallel reference line. Secondly, the location of the structural element within the 2D section is preferably shown by displaying a projected representation of the structural element within the 2D section, whereby a change of location of the structural element can be observed by a movement of the projected representation on the user visualization device. A third advantage relates to the dynamic selection of a reference line parallel to an alignment line, as the displaying of said information related to said location comprises selecting a reference line based on said location from the multiple section lines.

The computer-implemented method therefore comprises the following uninterrupted (by a user) chain of events, upon providing (by a user) a location of said structural element within said 2D section with said at least one user input device:

determining said location based at least in part on the signals received from said at least one user input device;

based at least in part on said location, selecting for each alignment line of said at least two alignment lines a corresponding parallel reference line from said multiple section lines; and displaying for each alignment line the distance to said corresponding reference line on said user visualization means.

Hereby, the location is preferably provided by a cursor movement device such as a computer mouse. Once a new location has been determined, the reference lines are selected and the distances displayed. The method can comprise a repeated determination of the location at discrete points in time based at least in part on signals from said at least one user input device, and the corresponding repeated updating of said information on said user visualization means. The method may thereby use time intervals in between the discrete points in time as to let the movement of said structural element within said 2D section appear on the user visualization device continuous in time to a user, and in particular the corresponding selection of reference lines and the display of distances. Preferably, the refresh rate of the user visualization device and the frequency of the determination of the location is at least 24 Hz.

In a preferred embodiment, said at least two alignment lines comprise two intersecting alignment lines. Preferably, the intersection of said two intersecting alignment lines defines said location of said structural element within said 2D section. In an especially preferred embodiment, said intersection is indicated by means of a cursor on the user visualization device. The cursor thereby tracks on the user visualization device the cursor movement provided by a user via a cursor movement device (a particular type of user input device).

This is advantageous, as the user is provided with an intuitive way of repositioning said two intersecting alignment lines within said 2D section. The repositioning of said two intersecting alignment lines can be performed by moving the cursor on the user visualization device.

In a preferred embodiment, said structural element comprises a boundary, and said at least two alignment lines comprise a tangent to said boundary. This is advantageous, because for non-polygonal boundaries, such as, for example, a circular boundary, it allows to determine an alignment line to indicate the distance between said boundary and a reference line of the 2D section. When the boundary is polygonal, the tangent to a boundary edge is coaxial with said boundary edge, and said boundary edge may define the alignment line.

In a preferred embodiment, the structural element comprises a rectangular boundary comprising four straight boundary edges. Each of the four boundary edges defines hereby an alignment line. The step of selecting for such an alignment line a corresponding parallel reference line comprises the step of determining for said alignment line the parallel line of said multiple section lines encountered first when moving within the 2D section from the center of the boundary edge defining said alignment line in a direction perpendicular to the alignment line and away from the structural element.

This is advantageous as the center of a boundary edge comprises a clear, quick, and unambiguous way to determine the closest (outward-lying with respect to the structural element) parallel line as a reference line. It is also immediately clear for a user how the selection occurs, so that a user can quickly become familiar with the computer-implemented method.

In a preferred embodiment, the computer-implemented method comprises the step of locking one of said distances based at least in part on signals from the at least one user input device. Thereby the step of updating the location of said structural element is subsequently subject to said locking of said one of said distances. Movement of the structural element within the 2D section is thus restricted to movement in the direction of the alignment line for which the distance is locked. This is advantageous as a user may first focus on correctly setting a first of said distances and may secondly focus on correctly setting another distance.

In a preferred embodiment, the computer-implemented method comprises the steps of selecting and overwriting one of said distances based at least in part on signals from the at least one user input device. Preferably said signals comprise signals from a text input device, such as, for example, a keyboard.

Preferably, a first key on a text input device allows to switch between said distances, whereby a currently selected distance is indicated on the screen by a highlighted textbox comprising said distance. Alternatively, or in addition to, the currently selected distance may be indicated by a cursor displayed at least intermittently within a textbox comprising said distance. Upon overwriting the selected distance with numerical and/or decimal keys on the text input device, said first key may be pressed for switching between said distances. Alternatively, another key may be used to confirm the overwritten distance. The overwritten distance hereby becomes locked. Preferably, said first key is a tab key. Upon pressing a second key on said text input device, the structural element may be placed relative to the 2D section, i.e. its location may become independent from cursor movement. Preferably said second key is an enter key, but said second key may also be another key.

When the 2D section comprises a second structural element with a fixed alignment line, for example because the second structural element has already been placed in the 2D section, said fixed alignment line of the second structural element becomes one of multiple section lines of the 2D section. The computer-implemented method may then comprise the step of snapping an alignment line of the at least two alignment lines of the inserted structural element coaxial to said fixed alignment line. The snapping may be triggered whenever the cursor moves within a predetermined distance of said fixed alignment line. This is advantageous as it helps a user to align structural elements, such as, for example, two windows within a wall. Preferably, the distance between said alignment line and the corresponding parallel reference line can be locked based at least in part on signals from the at least one input device, such as, for example, a signal triggered by pressing a predetermined key on a text input device.

Preferably, the computer-implemented method comprises the step of altering on the user visualization device the color of said 2D section. When said 2D section is selected in the CAD structure before insertion of said structural element, a user may switch between different 2D sections by means of the at least one user input device, and the currently suggested 2D section may be represented on the user visualization device with an altered color. This is advantageous as it helps a user to immediately observe the relevant 2D section.

Preferably, the computer-implemented method comprises the step of aligning a coordinate system with said 2D section, preferably aligning a coordinate system with two intersecting section lines of said 2D section. Preferably said coordinate system is displayed on the user visualization device. This is advantageous for at least two reasons. First, the displayed coordinate system additionally helps a user to immediately perceive the relevant 2D section. Secondly, it provides for intuitive coordinates within the 2D section.

In a preferred embodiment, the computer-implemented method comprises the steps of:
- displaying on the user visualization device an indication line in between an alignment line and its corresponding parallel reference line, preferably said indication line perpendicular to said alignment and reference lines, and
- displaying on the user visualization device the distance in between said alignment line and said corresponding parallel reference line in a textbox positioned over the indication line, said textbox further preferably positioned in between said alignment line and said corresponding parallel reference line.

This is advantageous as it is immediately clear to a user which reference lines have been selected based on the location of the structural element, as well as which of the distances corresponds to each of the alignment and reference line pairs.

The invention may also relate to a computer program product for positioning a structural element in a 2D section of a CAD structure by means of a computing system comprising at least one processor, a user visualization device, and at least one user input device. The computer program product thereby comprises instructions suitable for execution on said computing system, whereby said instructions comprise instructions for performing the steps of the computer-implemented method.

The invention may also relate to a server for positioning a structural element in a 2D section of a CAD structure, whereby the server comprises at least one processor, a tangible non-transitory storage medium, and a communication module for communicating with a user computing system comprising a user visualization device and at least one user input device, the server configured for performing the steps of the computer-implemented method. Hereby, the selection of the reference lines is performed on the server, while the at least one user input device and the user visualization device are used as described in the computer-implemented method.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

The invention is further described by the following non-limiting examples, which further illustrate the invention, and are not intended to, nor should they be interpreted to, limit the scope of the invention.

The present invention will be now described in more details, referring to examples that are not limitative.

FIGURES

FIG. 1 is a flow chart for defining a drawing point/location in accordance with one or more embodiments of the invention. At step 101, a model of a terrain is obtained in a computer-aided design (CAD) building information model (BIM) application. Said CAD model comprises a 2D or 3D model and is in a preferred embodiment a composite object comprising two or more objects (which comprise lines and curves) of a given type. Each of the objects defines a geometry that is part of the terrain/composite object. In a preferred embodiment, each of the objects are drawn with unique colors and selection markers, allowing various elements to be easily identified. The objects are drawn as colored contours in 2D view and colored faces in 3D solid-shaded view.

At step 102, a user selects a 2D section of the CAD model. In an embodiment, said 2D section comprises a 2D face of a 3D object, or, a cross section of several objects comprised by the 3D composite object. In another embodiment, said 2D section comprises a user-defined section of a 2D model.

At step 103, at least two intersecting alignment lines are displayed. A cursor position is located in the intersection point of two of the at least two alignment lines, which track the position of the cursor. The chosen alignment lines can be non-orthogonal, but are in practice often orthogonal, because the alignment lines often comprise the boundary edges of an inserted object.

At step 104, reference lines parallel to the alignment lines and comprised by the 2D section are determined. In an embodiment, two or more reference lines are defined. In another embodiment, n alignment lines are displayed and n corresponding reference lines are determined, whereby each of the reference lines is parallel to one of the alignment lines. At least two of the n alignment lines intersect in the cursor position. According to the method, two or more alignment lines can be displayed (hence n equals to two or more). In practice the alignment lines can but do not have to comprise a boundary edge of a to-be-inserted object. Alignment lines can also be introduced purely to guide the eye.

At step 105, a user provides input via a cursor control device, while a cursor is over/hoovers over the 2D section. The alignment lines, which remain parallel to the reference lines, track the cursor movement, while an intersection point of some of the alignment lines is retained in the cursor position. In a preferred embodiment of the invention, the orthogonal distances from the alignment lines to each of the reference lines are displayed. The reference lines are determined dynamically, depending on the position of the alignment lines, which is changed by moving the cursor. Therefore, there is an interplay between steps 104 and 105, whereby the alignment lines are moved and the reference lines, being the lines parallel to and closest to each of the alignment lines, are determined.

In step 106, distances from the alignment lines to the reference lines are provided to define the drawing point/location. In a 2D section, a user holds two degrees of freedom to unequivocally select a drawing point. These degrees of freedom can be limited by providing distances to reference lines by means of manually entering the distances (by keyboard device input) and/or by clicking input via a cursor control device while the cursor is hovering over the 2D cross section. At step 107, the drawing point is uniquely defined by the provided distances.

In case more than two non-parallel alignment lines are provided, a user can provide the distances to more than two reference lines to determine the desired drawing point, e.g. in a dialog box with n fields if n alignment lines are displayed and n reference lines are determined. In practice, the number n of alignment lines equals 4 for most inserted objects.

In FIG. 2 a section of an object 1, which can be comprised by a composite object, is shown. A user has selected a 2D section (2, indicated with the thick lines) comprised by an object of the model, such as the face of a wall provided with a sub-object 4, such as a door. In another embodiment, the 2D section can comprise a 2D cross section of the model. The 2D section determines the User Coordinate System (3; UCS), comprising an orthogonal X- and Y-axis aligned with the 2D section and a Z-axis perpendicular to the 2D section. Said 2D section comprises side lines 10, which are possible reference lines 6 when inserting a new object 8, like a window. This new object comprises a set of alignment lines 5 and is positioned at the cursor position 9. A user can alter the position of the inserted object 8 by hovering the cursor over the 2D section. The determination of the reference lines 6 is performed dynamically depending on the position of the cursor (and therefore the position of the inserted object). Note that the upper alignment line 5 of the inserted object 8 does not have a corresponding reference line, because the upper side line of the 2D section is not parallel to said alignment line and the lower reference line of the 2D section is already occupied by the lower alignment line 5 of the inserted object 8. Offset lines provided with dialog boxes 7 are provided between the alignment lines 5 and the corresponding reference lines 6. Each of the offset lines is positioned orthogonally to the alignment lines and located in the middle of said lines. A user can provide the desired distance in the dialog boxes. The specific numbers d1, d2 and d3 given in the dialog boxes are only for illustration purposes.

Figure 3:
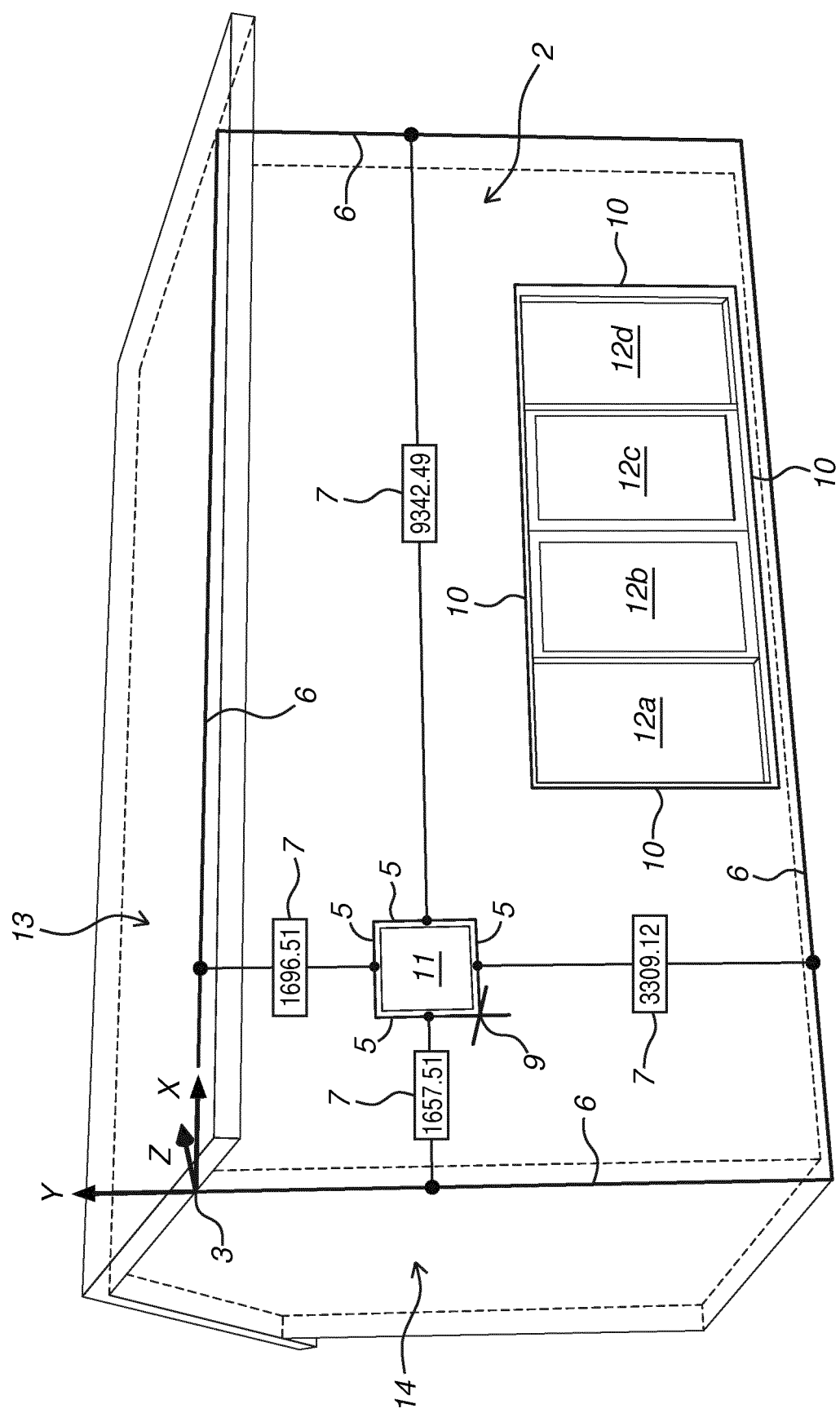
Figure 4:
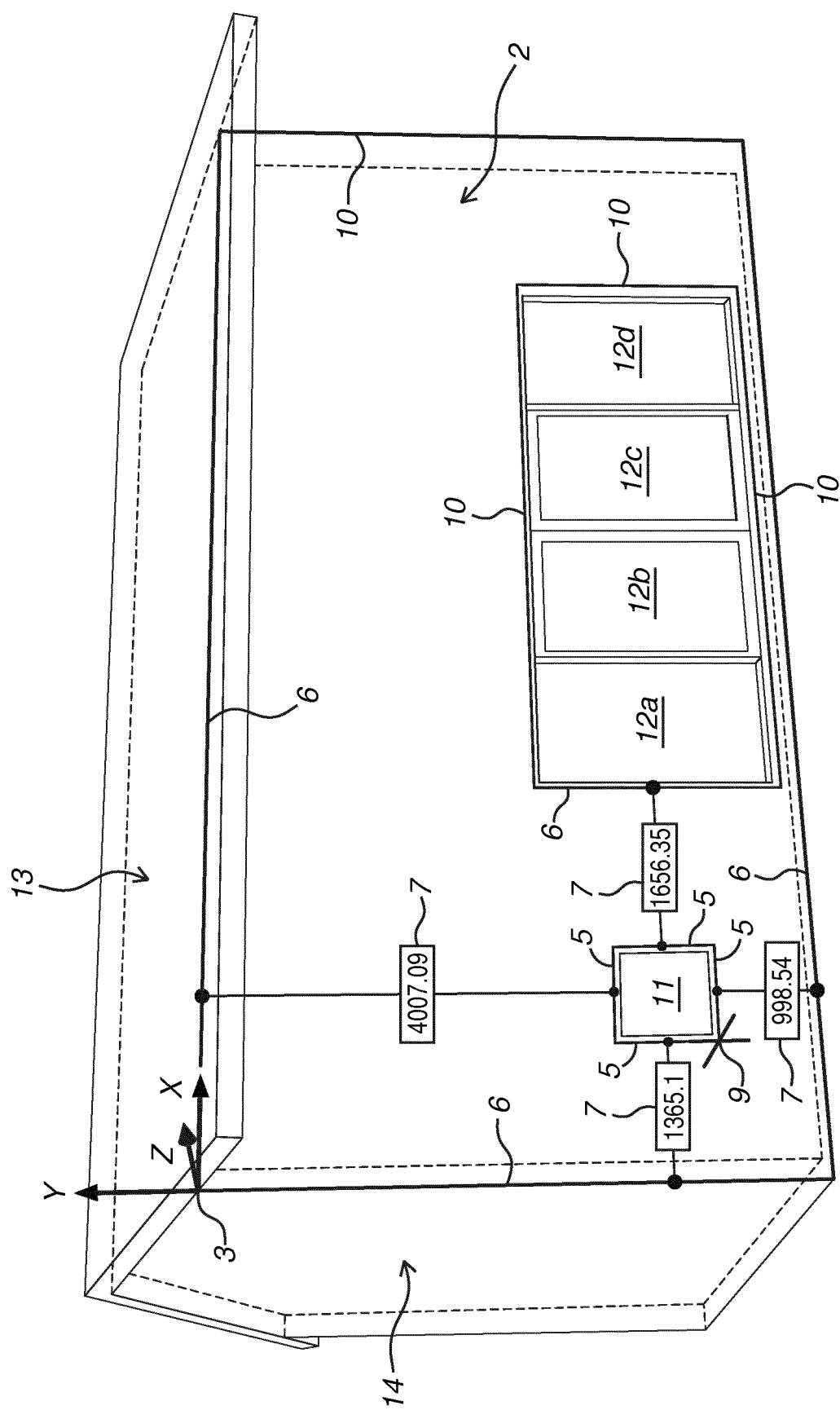
Figure 5:
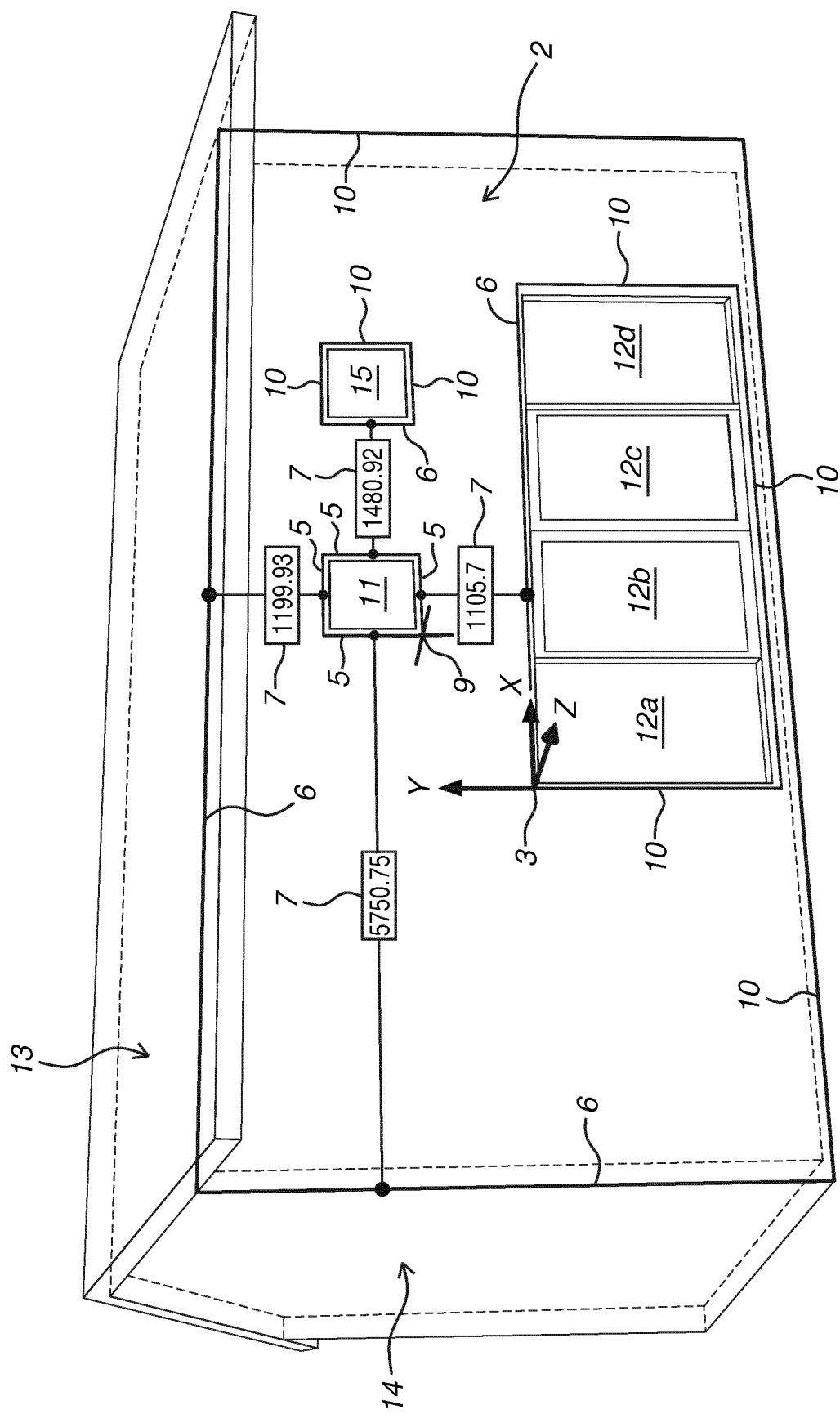

FIGS. 3 to 5 show a schematic representation of another example illustrating an embodiment of the present invention. A CAD structure is displayed, e.g. a BIM. A 2D section 2 has been selected and the multiple section lines 6, 10 of said 2D section 2 are highlighted by thicker lines. A User Coordinate System 3 has been associated with the 2D section 2. Previously positioned structural elements 12, 15 comprise boundary edges which are part of the multiple section lines 6, 10 as well. Depending on the location of the inserted structural element 11, which comprises four boundary edges defining the alignment lines 5, four reference lines 6, are selected as well. Each of these reference lines 6 is parallel to one of the alignment lines 5. The section line 6, 10 selected as parallel reference line 6 corresponding to an alignment line 5, is the parallel line of said multiple section lines 6, 10 encountered first when moving within the 2D section 2 from the center of the boundary edge defining said alignment line 5 in a direction perpendicular to the alignment line 5 and away from the structural element 11. The distances between an alignment line 5 and a corresponding parallel reference line 6 are provided in dialog boxes 7. Each of the offset lines is positioned orthogonally to the alignment lines 5 and comprises an end in the middle of the boundary edge. The dialog boxes 7 are provided in the center of the offset lines. The inserted structural element 11 comprises four alignment lines, to two intersecting ones of which is associated a cursor 9. Furthermore shown in FIGS. 3 to 5 are two other 2D sections 13, 14 which are currently not selected.

It is supposed that the present invention is not restricted to any form of realization described previously and that some modifications can be added to the presented example of fabrication without reappraisal of the appended claims. For example, the present invention has been described referring to 2D sections (providing distances to reference lines in a plane), but it is clear that the invention could be applied in 3D models (e.g. providing distances to reference lines or planes) for instance.

Overview of the numbering used in the figures:
1. object comprised by a model or composite object
2. 2D section
3. User Coordinate System
4. Sub-object comprised by the object
5. Alignment lines
6. Set of possible reference lines comprised by the 2D section
7. Offset lines with dialog boxes, providing distances from alignment lines to the closest parallel reference line
8. Inserted object
9. Cursor position
10. Set of side lines (not selected as reference line)
11. Inserted object, structural element
12. Sub-object comprised by the object and fixed with respect to the 2D section
13. Other, non-selected, 2D section
14. Other, non-selected, 2D section 15. Sub-object comprised by the object and fixed with respect to the 2D section

The invention claimed is:
1. A computer-implemented method for positioning a structural element in a 2D section of a CAD model by a computing system comprising a user visualization device and at least one user input device, the computer-implemented method comprising the steps of:
displaying at least a part of a CAD model on the user visualization device, said CAD model comprising a 2D section comprising multiple lines, said 2D section further comprising a structural element comprising a boundary defining at least two intersecting alignment lines, whereby said intersection defines a location of said structural element within said 2D section, and
dynamically updating the location of said structural element within said 2D section based at least in part on signals from the at least one user input device, thereby dynamically displaying information related to the updated location on the user visualization device,
wherein said step of dynamically displaying information related to the updated location comprises:
determining for each alignment line of said at least two alignment lines a corresponding parallel reference line, said reference line being selected dynamically, depending on the position of the alignment line, as the first encountered parallel line from said multiple lines of said 2D section when moving within the 2D section from the boundary defining the alignment line in a direction perpendicular to the alignment line and away from the structural element, and
displaying for each alignment line the distance to said corresponding parallel reference line,
wherein during said dynamically updating of said location of said structural element, a change of reference line occurs for an alignment line of said at least two intersecting alignment lines.

2. A computer-implemented method according to claim 1, wherein, said intersection is indicated on the user visualization device by a cursor which tracks cursor movement provided via said at least one user input device.

3. A computer-implemented method according to claim 1, wherein, said structural element comprises a boundary, and said at least two alignment lines comprising a tangent line to the boundary.

4. A computer-implemented method according to claim 1, wherein, said structural element comprises a rectangular boundary comprising four boundary edges, each of the four boundary edges defining an alignment line, the step of selecting for such an alignment line a corresponding parallel reference line comprising the step of determining for said alignment line the parallel line of said multiple lines of said 2D section encountered first when moving within the 2D section from the center of the boundary edge defining said alignment line in a direction perpendicular to the alignment line and away from the structural element.

5. A computer-implemented method according to claim 1, wherein, the computer-implemented method comprises the step of locking one of said distances based at least in part on signals from the at least one user input device, and whereby the step of updating the location of said structural element is subsequently subject to said locking of said one of said distances.

6. A computer-implemented method according to claim 1, wherein, the computer-implemented method comprises the steps of selecting and overwriting one of said distances based at least in part on signals from the at least one user input device.

7. A computer-implemented method according to claim 1, wherein, the 2D section comprises a second structural element comprising a fixed alignment line, the computer-implemented method comprising the step of snapping an alignment line of the at least two alignment lines of the inserted structural element coaxial to said fixed alignment line.

8. A computer-implemented method according to claim 5, wherein, the computer-implemented method comprises the step of locking the distance between said snapped alignment line and the corresponding parallel reference line.

9. A computer-implemented method according to claim 1, wherein, the computer-implemented method comprises the step of altering on the user visualization device the color of said 2D section.

10. A computer-implemented method according to, claim 1 wherein, the computer-implemented method comprises the step of selecting said 2D section based at least in part on signals from the at least one user input device.

11. A computer-implemented method according to claim 1, wherein, the computer-implemented method comprises the step of aligning a coordinate system with said 2D section.

12. A computer-implemented method according to claim 1, wherein, the computer-implemented method comprises the steps of:
displaying on the user visualization device an indication line in between an alignment line and its corresponding parallel reference line, and
displaying on the user visualization device the distance in between said alignment line and said corresponding parallel reference line in a textbox positioned over the indication line, said textbox further positioned in between said alignment line and said corresponding parallel reference line.

13. A computer-implemented method according to claim 1, wherein, the CAD model is a building information model.

14. A computer program product for positioning a structural element in a 2D section of a CAD model by a computing system comprising at least one processor, a user visualization device, and at least one user input device, the computer program product comprising at least one non-transitory computer readable media storing instructions for:
displaying at least a part of a CAD model on the user visualization device, said CAD model comprising a 2D section comprising multiple lines, said 2D section further comprising a structural element comprising a boundary defining at least two intersecting alignment lines, whereby said intersection defines a location of said structural element within said 2D section, and
dynamically updating the location of said structural element within said 2D section based at least in part on signals from the at least one user input device, thereby dynamically displaying information related to the updated location on the user visualization device,
wherein the instructions for dynamically displaying information related to the location comprise instructions for:
determining for each alignment line of said at least two intersecting alignment lines a corresponding parallel reference line, said reference line being selected dynamically, depending on the position of the alignment line, as the first encountered parallel line from said multiple lines of said 2D section when moving within the 2D section from the boundary defining the alignment line in a direction perpendicular to the alignment line and away from the structural element, and displaying for each alignment line the distance to said corresponding parallel reference line, wherein the instructions for dynamically updating said location of said structural element, comprise instructions for a change of reference line for an alignment line of said at least two intersecting alignment lines.

15. A server for positioning a structural element in a 2D section of a CAD model, the server comprising at least one processor, a tangible non-transitory storage medium, and a communication module for communicating with a user computing system comprising a user visualization device and at least one user input device, the server configured for:

displaying at least a part of a CAD model on the user visualization device, said CAD model comprising a 2D section comprising multiple lines, said 2D section further comprising a structural element comprising a boundary defining at least two intersecting alignment lines, whereby said intersection defines a location of said structural element within said 2D section, and dynamically updating the location of said structural element within said 2D section based at least in part on signals from the at least one user input device, thereby dynamically displaying information related to the updated location on the user visualization device, wherein the server is configured for dynamically displaying information related to the location by:

determining for each alignment line of said at least two alignment lines a corresponding parallel reference line, said reference line being selected dynamically, depending on the position of the alignment line, as the first encountered parallel line from said multiple lines of said 2D section when moving within the 2D section from the boundary defining the alignment line in a direction perpendicular to the alignment line and away from the structural element, and displaying for each alignment line the distance to said corresponding parallel reference line, wherein the server is configured, during said dynamically updating of said location of said structural element, for changing of reference line for an alignment line of said at least two intersecting alignment lines.

16. A computer-implemented method according claim 3, wherein said tangent line is a boundary edge of said structural element.

17. A computer-implemented method according to claim 11, wherein, the computer-implemented method comprises the step of aligning the coordinate system with two intersecting lines of said 2D section.

18. A computer-implemented method according to claim 12, wherein, said indication line is perpendicular to said alignment and reference lines.

* * * * *